United States Patent [19]

Martin et al.

[11] Patent Number: 4,531,617
[45] Date of Patent: Jul. 30, 1985

[54] OVERSPEED SAFETY BRAKING DEVICE

[75] Inventors: Derek J. Martin, Standon; Michael D. Barker, Hunsdon Nr. Ware, both of England

[73] Assignee: D. Wickham and Company Limited, Hertfordshire, England

[21] Appl. No.: 550,503

[22] Filed: Nov. 9, 1983

Related U.S. Application Data

[63] Continuation of Ser. No. 252,708, Apr. 9, 1981, abandoned.

[30] Foreign Application Priority Data

Apr. 10, 1980 [GB] United Kingdom ............... 8011881

[51] Int. Cl.³ .............................................. B66B 5/16
[52] U.S. Cl. ...................................... 187/89; 188/187; 188/72.7
[58] Field of Search .................. 187/89, 80, 73, 77, 187/78, 38; 188/187, 188, 72.8, 72.7, 71.1, 134; 192/94, 103 R, 103 A

[56] References Cited

U.S. PATENT DOCUMENTS 3,327,811 6/1967 Mastrobirte ........................ 188/188

FOREIGN PATENT DOCUMENTS 1555621 11/1979 United Kingdom .................. 187/89

Primary Examiner—Joseph J. Rolla
Assistant Examiner—Kenneth Noland
Attorney, Agent, or Firm—Robert T. Gammons

[57] ABSTRACT

An overspeed safety braking device comprising an input shaft, the speed of which is to be braked when it exceeds a limit value, a rotary friction brake having a fixed part and a rotary part, the input shaft being permanently coupled for rotation with the rotating part of the rotary friction brake, a control device for applying the brake, and centrifugal activated structure comprising a braking member which rotates with the input shaft when the speed is below the limit value, a weight pivotally mounted on the braking member and biasing spring coupled to the weight and arranged to bias the weight toward the axis of rotation of the shaft when the speed is below the limit value and away from the axis of rotation when the speed is above the limit value.

27 Claims, 9 Drawing Figures

OVERSPEED SAFETY BRAKING DEVICE

This application is a continuation of application Ser. No. 252,708, filed Apr. 9, 1981 now abandoned.

The invention relates to overspeed braking devices which can be used with various kinds of vehicle such as trucks or hoists for retarding the vehicle if the speed exceeds a certain limit. In particular, they are often fitted to rack and pinion-driven goods hoists where they play no part in stopping or retarding the hoist during normal operation but are used to bring the hoist rapidly to a halt if it goes out of control and begins to fall under its own weight.

It is known for such braking devices to be activated by a centrifugal arrangement which includes a weight mounted so that it rotates about the same axis as a pinion which engages the drive rack of the hoist and, as the rate of rotation increases, the weight is able to move away from the axis of rotation against the action of a spring until it engages the rotary part of a brake mechanism. The weight than acts as a driving sprag and forces the rotary part of the brake to rotate with it against a resistive force exerted by fixed brake pads so that the weight and, hence, the pinion is brought to a halt.

This type of arrangement has the disadvantage that the weight assembly must transmit the entire braking force which is to be applied to the hoist and must therefore be very robust. This is a particular disadvantage on hoist where the limit value on speed is low. Rotation of the weights normally occurs in a vertical plane and achieving engagement at a precise speed is difficult when the gravitational force is large compared to the centrifugal force. There is a risk that the centrifugal weight assembly or the brake or the drive rack will be damaged, especially by the shock when the weight first engages the drum, and that the brake will fail altogether. It has also been known for a hoist which has been brought abruptly to a halt to bounce so that the weight becomes disengaged from the brake mechanism and the hoist begins to fall again until the weight re-engages the brake mechanism. This may occur several times in succession so that the hoist may fall quite some distance before it is finally brought to rest.

In accordance with the invention in a first aspect there is provided an overspeed safety braking device comprising an input shaft the speed of which is to be braked when it exceeds a limit value; a rotory friction brake having a fixed post and a rotary post, the input shaft being permanently coupled for rotation with the rotating post of the rotary friction brake; a control device for applying the brake; and centrifugal activating means comprising a support member which rotates with the input shaft when the speed is below the limit value, a weight pivotally mounted on said support member and overcentering biasing means coupled between said weight and said support member, said biasing means being arranged to bias the weight toward the axis of rotation of the shaft until the speed has exceeded the limit value to overcenter upon the speed reaching the limit value and to bias the weight away from the axis of rotation when the speed has exceeded the limit value.

With this arrangement the braking force is transmitted from the rotating part of the brake to the input shaft without being transmitted through the activating means. The activating means serve to cause the brake to be supplied. Thus the risk of damage to the activating means by the braking force is avoided. Once the control device has been activated, the activating means plays not further part in the braking and if the hoist should bounce, braking will not be interrupted.

According to the present invention in another aspect there is provided an overspeed safety braking device comprising an input shaft, the speed of which is to be braked when it exceeds a limit value, and which is permanently coupled for rotation with the rotating part of a rotary frictional brake, and centrifugal activating means responsive to the speed of rotation exceeding the limit value for activating a control device to apply the brake and thus brake the input shaft, the centrifugal activating means comprising a member which rotates with the input shaft when the speed is below the limit value, and which carries a weight which is biassed towards the axis of rotation of the shaft and which can move away from the axis of rotation of the shaft against the action of the biassing means as the speed increases, the distance of the weight from the axis of rotation when the shaft is stationary being at least as great as the inner radius of the friction surfaces of the brake. With such an arrangement braking devices in which accurate activation at low speeds can be achieved.

According to the present invention in another aspect there is provided an overspeed safety braking device comprising an input shaft, the speed of which is to be braked when it exceeds a limit value, and which is permanently coupled for rotation with the rotating part of a rotary frictional brake, means responsive to the speed of rotation of the input shaft exceeding the limit value for activating a control device to supply the brake and thus brake the input shaft, means for biassing the rotating part and a fixed part of the brake into engagement and the control device includes means for compressing the biassing means when activated, the means for compressing comprising a first member with a screw-threaded which is engaged with a complementary screw-threaded on a second member fixed to the input shaft, the first screw-threaded member being arranged to rotate with the second screw-threaded member and the input shaft when the speed is below the limit but being prevented from rotation by the activating means at speeds above the limit whereby the first threaded member travels axially on the second screw-threaded to compress the biassing means, the activating means comprising a member which is fixed to the first screw-threaded member and which carries a weight biassed towards the axis of rotation and which can move away from the axis of rotation against the action of the biassing means as the speed of rotation increases, a catch being carried by the weight, the catch engaging a fixed stop when the speed of the shaft exceeds the limit value to prevent rotation of the first screw-thread member, and a first locking member fixed to the weight and a second locking member fixed to the second screw-threaded member, the first locking member engaging the second locking member to prevent relative rotation of the first and second screw-threaded members, the first locking member disengaging the second locking member when the weight has moved a certain distance away from the axis of rotation.

Several embodiments of a braking device in accordance with the invention will now be described in detail with reference to the accompanying drawings, of which, FIG. 1 shows a hoist on a mast and driven by a rack and pinion mechanism;

Figure 1:
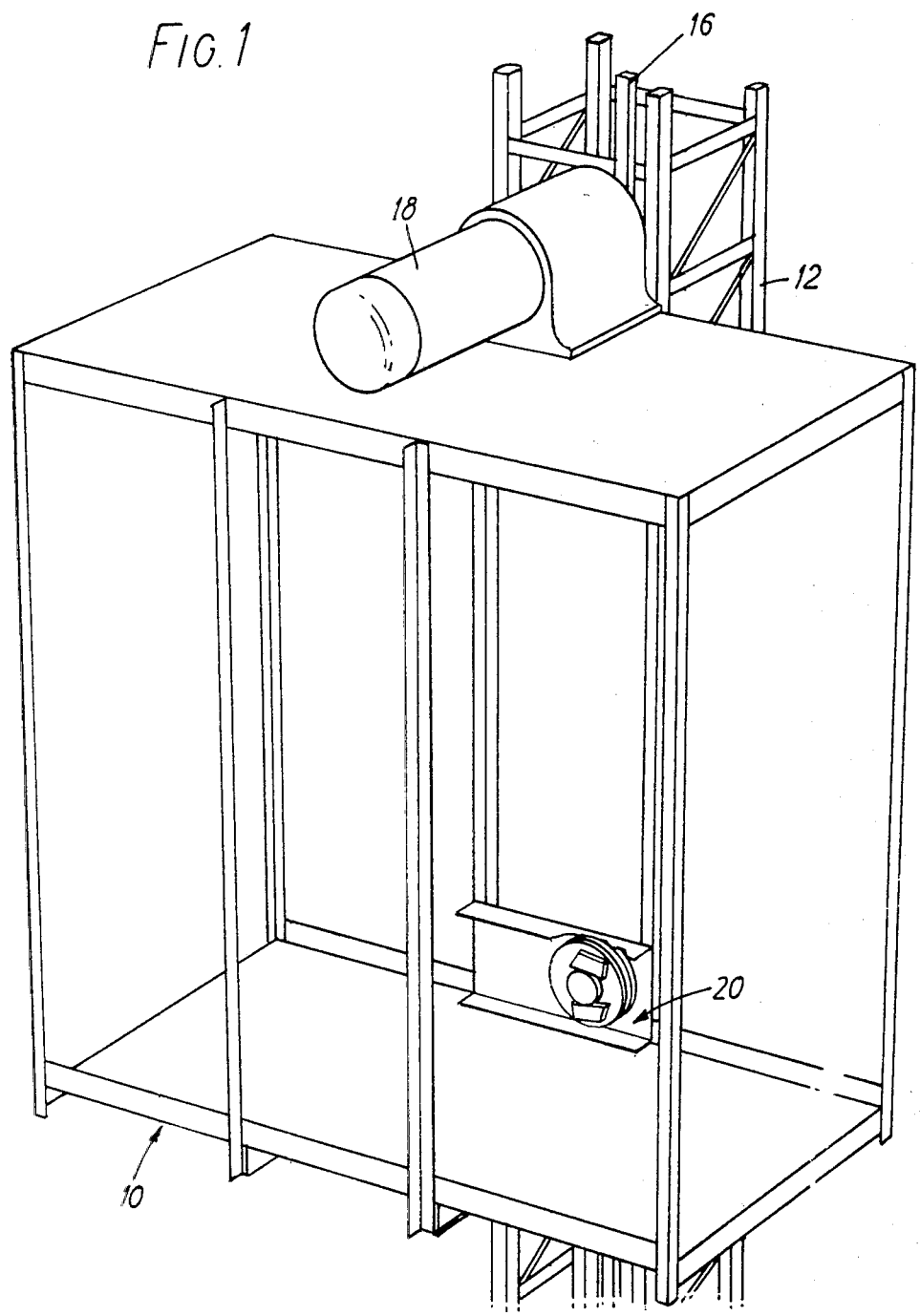

FIG. 1 shows a goods or passenger hoist 10 which is arranged to travel up and down a mast 12 and which is driven by means of a rotating pinion which engages a drive rack 16 mounted on the mast 12. The pinion is driven by a motor 18 so that it can rotate in either sense, causing the hoist 10 to move either up or down the mast 12.

Figure 2:
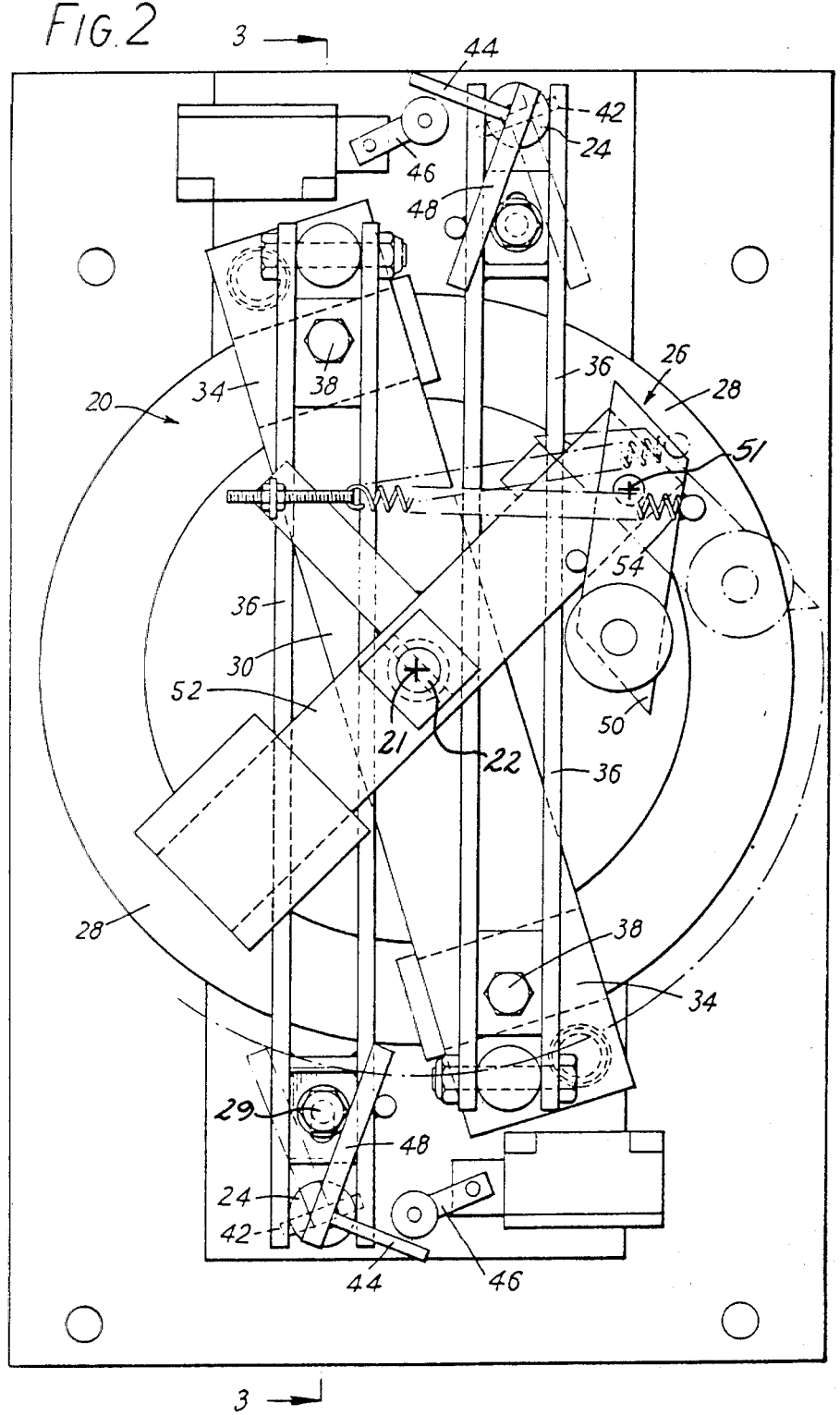
FIG. 2 shows an elevation of a braking device in accordance with the invention.
Figure 3:
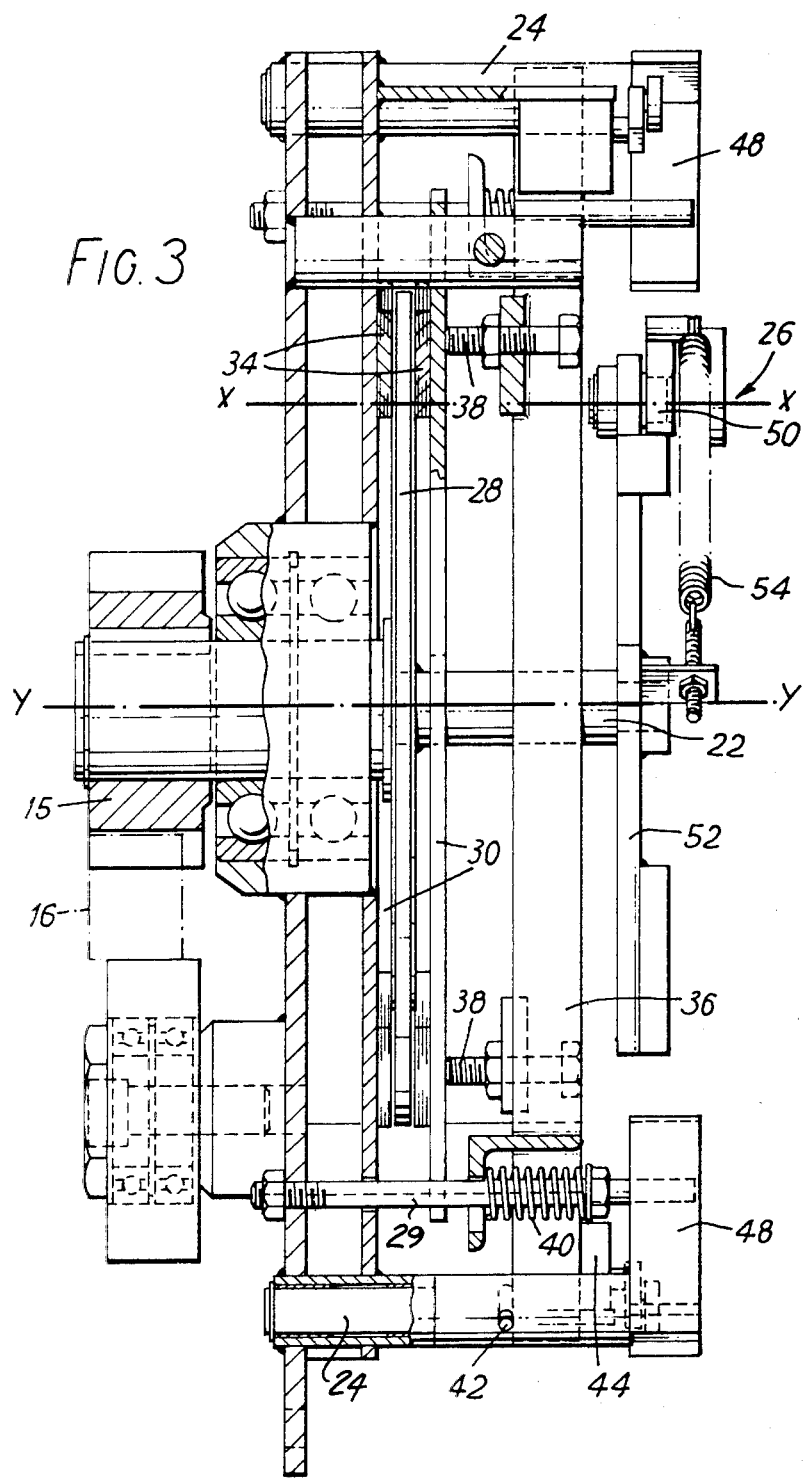
FIG. 3 is a sectional view of the braking device of FIG. 2 along the line 3—3 of FIG. 2.

The braking device shown in FIGS. 2 and 3 includes a rotary disk brake 20. An input shaft 22 extends through a mounting plate 32 for the braking device and is journaled in bearings 23. A pinion 15 which engages the drive rack 16 is fixed on one end of the shaft. The rotary part of the brake 20, that is the disc 28 is keyed onto the shaft on the opposite side of the bearing 23 to the pinion 15. The disc 28 is positioned between a pair of plates 30 which constitute the fixed part of the brake. One of the plates 30 is fixed against both axial and rotational movement relative to the mounting plate 32. The other plate can move axially but is fixed against rotation by means of two posts 29 which pass through holes in the plates 30 and are fixed to the mounting plate 32. The fixed plates 30 are normally held apart and away from the disc 28 by springs (not shown) acting between the plates at opposite ends so that the disc can rotate freely between the plates.

A control device activated by an activating means in the form of a centrifugal weight assembly 26 causes the brake to be applied when the speed of the pinion exceeds a certain limit. When the brake is applied, the plates 30 and the disc 28 are urged into contact with one another so that brake pads 34, mounted on the plates 30 exert a frictional braking force on the rotating disc 28.

The plates 30 and the disc 28 are urged together when the brake is applied by a pair of spring-biassed levers 36. Each lever is pivoted at one end on a pinion 35 which passes through one of the posts 29. An adjustable screw abutment 38 carried by the lever bears against the brake plate 30 at the end of the lever nearest to the pivot pin 35 and is urged towards the plate 30 by a spring 40 at the end of the lever furthest from the pivot pin.

The arrangement of the lever is such as to provide a mechanical advantage in the force exerted on the brake plates by the spring 40.

When the hoist is operating normally the brake is not applied and the springs 40 are prevented by the control device from causing the fixed plates 30 to be urged against the disc 28. To this end each lever 36 is held in a retracted position such that its abutment 38 is not in contact with the plate 30. Stops provided by a crosspiece 42 on a pivotable spindle 25 engage beneath the lever 36, holding the spring 40 compressed and preventing the abutment 38 from pressing the plates 30 against the disc 28.

The levers 36 can be released by pivoting the spindles 24 so that the stops no longer extend beneath the lever 36.

The spindles 24 are each provided with an arm 44 which is arranged to operate a switch 46 as the spindle 24 is pivoted and the brake 20 is brought into operation. The switch 46 cuts off the supply of power to the hoist.

The brake 20 is activated at the limit value by means of a centrifugal weight assembly. This assembly includes a weight 50 which is pivotably fixed to a bar 52 which, in turn, rotates with the input shaft 22. The weight 20 is pulled towards the axis of rotation by a spring 54 which is attached to a bracket 49 on the bar 52 and which rotates with it. The tension in the spring 54 is adjustable by means of a screw 55 at its end remote from the weight 50.

An arm 48 which is fixed to the spindle 24 extends towards the shaft 22 when the crosspiece 42 is engaged beneath the lever 36. At speeds below the limit value, the end of the arm 48 lies outside the orbit described by the weight 50. As the speed of rotation of the shaft 22 increases to the limit value, the weight 50 pivots about an axis 51 away from the axis of rotation as the centrifugal force stretches the spring 54. The line of action of the spring 54 is close to the pivot axis 51 of the weight in the rest condition, and as the speed increases, the line of action moves closer to the axis. At the limit value the line of action moves to the other side of the pivot axis 51 so that the weight suddenly moves out with an over-centre action; the tension in the spring working in the same sense of rotation as the centrifugal force. This prevents the weight 50 returning to its original position once the shaft 22 has begun to slow down.

The orbit becomes so large that the weight 50 strikes the arm 48 and pivots the spindle 24. The pivoting of the spindle 24 results in rotation of the crosspiece 42 so the stops no longer engage beneath the lever 36 and the lever 35 is released, thereby applying the brake 20.

In the particular embodiment shown, the weight 50 strikes the first arm 48, releasing the first lever 36, and then continues its orbit to strike the second arm 48 and release the second lever 35.

It is particularly important in this embodiment that the weight 50 should not be able to return to a position in which its orbit is not intercepted by the arms 48 before the second lever 36 is brought into operation. This is prevented as described above by the over-centring action of the spring 54.

The braking force is thus applied in two steps, the full braking force being applied half a revolution after the first step.

The centrifugal weight arrangement 26 acts only to release the levers 36 and once this has been done, it plays no further part in braking the movement of the hoist so there is little chance of damage. This braking device is particularly useful in situations where the limit value on the speed of the hoist is relatively low. The use of heavy weights in arrangements where rotation takes place in a vertical plane causes difficulties due to the fact that the gravitational force is large compared to the centrifugal force. Previously, the length of the arm, on which the weight is mounted, has been limited by the dimensions of the brake drum, but in the braking device described above, the weight arrangement is axially offset from the brake mechanism so that the weight-carrying arm can extend beyond the edges of the brake plates. In particular, in the device shown in FIGS. 2 and 3, the distance of the pivot axis 51, FIG. 2, of the weight 50 represented by the line X—X in FIG. 3 from the axis 21, FIG. 2, of rotation of the shaft 22 represented by the line Y—Y, FIG. 3, is greater than the inner radius of the brake pads 34. This permits the use of a light weight even when the limit value on the speed is low.

Figure 4:
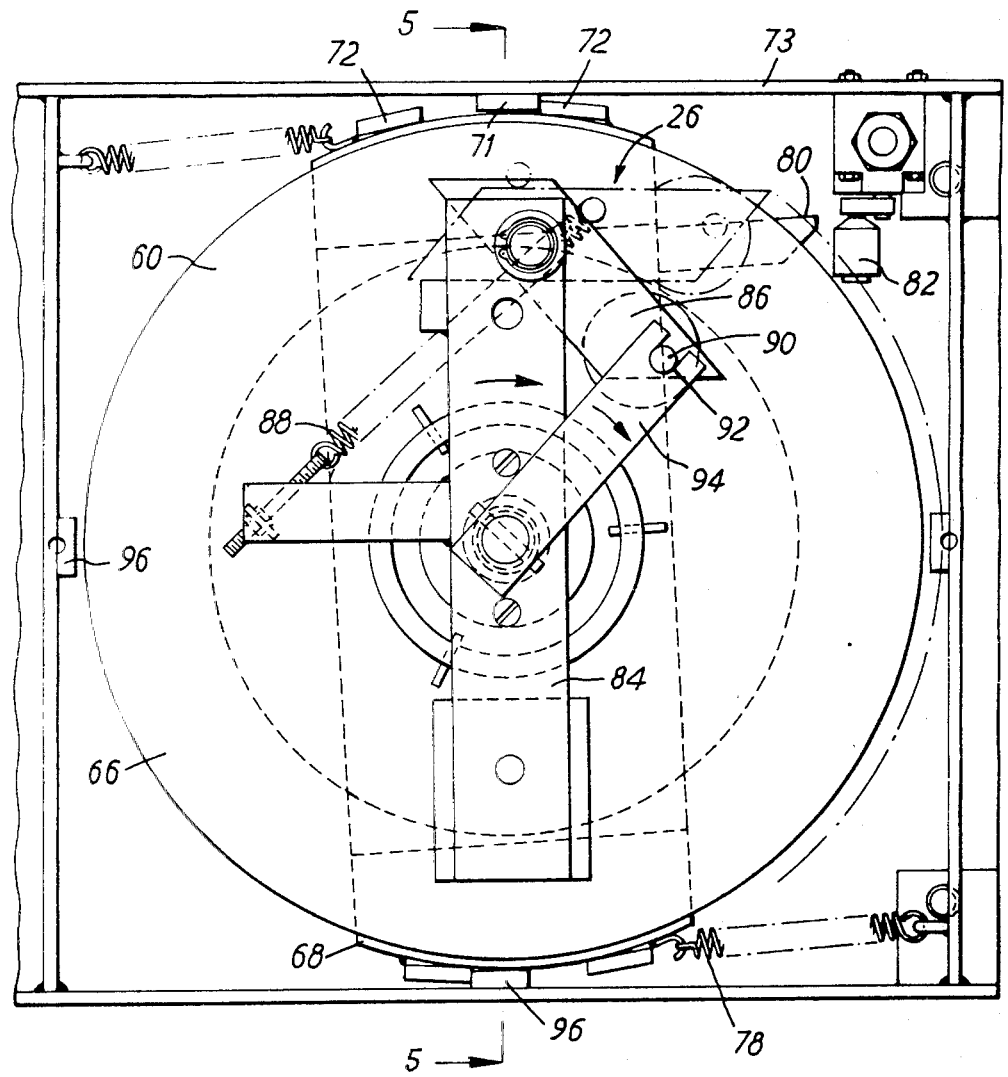
FIG. 4 shows an elevation of a second braking device in accordance with the invention.
Figure 5:
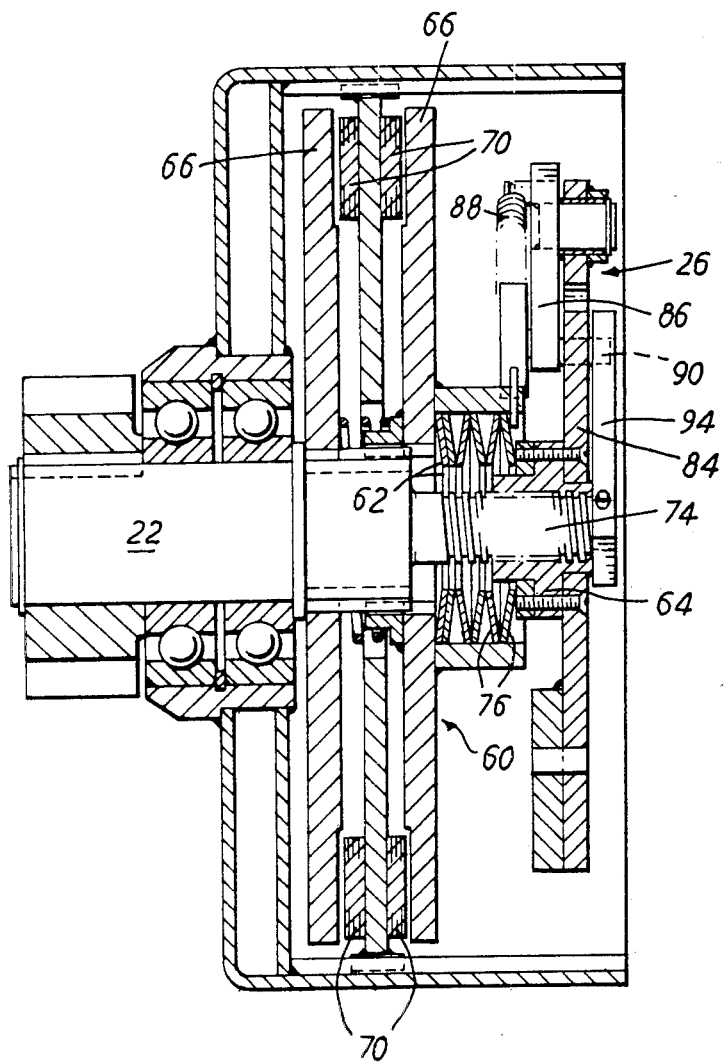
FIG. 5 is a sectional view of the braking device of FIG. 4 along the line 5—5 of FIG. 4.

The braking device shown in FIGS. 4 and 5 produces a more gradual braking effect and is therefore more suitable for use on passenger hoists. This device comprises a rotary disc brake 60 as before but in this case the plates are urged together by a compression spring 62. The spring 62 is compressed by the control device which is a nut member 64 arranged to travel axially along a threaded portion 74 of the shaft 22. The control device is once again activated by means of a centrifugal weight arrangement 26.

The brake 60 comprises two brake discs 66 which are keyed onto the shaft 22 so that they rotate with it but can move relative to it in an axial direction. Between the discs 66 is a plate 68, on which are mounted brake pads 70. The plate 68 can only pivot through a limited angle about the shaft 22, being constrained by a fixed stop 71 on the casing 73 engaging the stops 72 on the plate. The shaft 22 extends beyond the discs 66 to form the threaded portion 74 around which is disposed the compression spring 62 composed of a number of Belleville washers 76. The washers 76 are compressed by the nut member 64 which is threaded onto the thread portion of the shaft. When the control device is activated the nut member is caused to rotate relative to the shaft 22 and moves along its threaded portion is an axial direction towards the discs 66. The discs 66 are urged into contact with the brake pads 70 which exert a frictional braking force on them and bring them to a halt. When the plate 68 us engaged by the discs 66 it pivots between the stops 72, moving against the tension of a spring 78 and an arm 80 fixed to it operates a switch 82 to cut off the supply of power to the hoist.

In normal use, when the brake is not applied, the nut member 64 occupies a position on the shaft 22 in which the Belleville washers 76 are not compressed, and it rotates with the shaft so that there is no relative axial movement between the nut member and the shaft. The nut member 64 carries an activating means similar to that described above in relation to FIGS. 2 and 3. A bar 84 extends from the nut member 64 and carries at one end a pivoted weight 86. A spring 88 regulates the limit value on the speed as described in connection with the first embodiment. The weight 86 has fixed to it a peg 90 which occupies in a slot 92 formed in a restraining arm 94 which rotates with the shaft 22. This engagement between the restraining arm 94 and the weight 86 ensures that the nut member 64 rotates at the same speed as the shaft 22, preventing the inertia of the nut member causing relative rotation when the speed increases. As the speed of rotation increases, the weight 86 pivots away from the axis of rotation of the peg 90 escapes from the slot 92. The nut member is then free to rotate relative to the shaft. When the speed of the shaft reaches the limiting value the weight is swung out to the point at which the line of action of the spring passes through the pivot axis of the weight. The spring then starts to act on the weight in the same sense as the centrifugal force causing the weight to swing out further and engage a stop 96 on the casing 73 thus preventing the bar 84 from rotating around the axis of the shaft. Since there is now relative rotation between the nut member 64 and the threaded portion 74 of the shaft, the nut member 64 travels along the shaft 22 to compress the Belleville washers 76 and apply the brake. The braking force increases gradually as the washers 76 become more compressed and the hoist is gradually brought to a halt.

Again the centrifugal weight assembly serves only to trigger the control device. Once the peg 90 has left the slot 92, the nut member 64 must rotate relative to the shaft 22 regardless of any disturbances.

Figure 6:
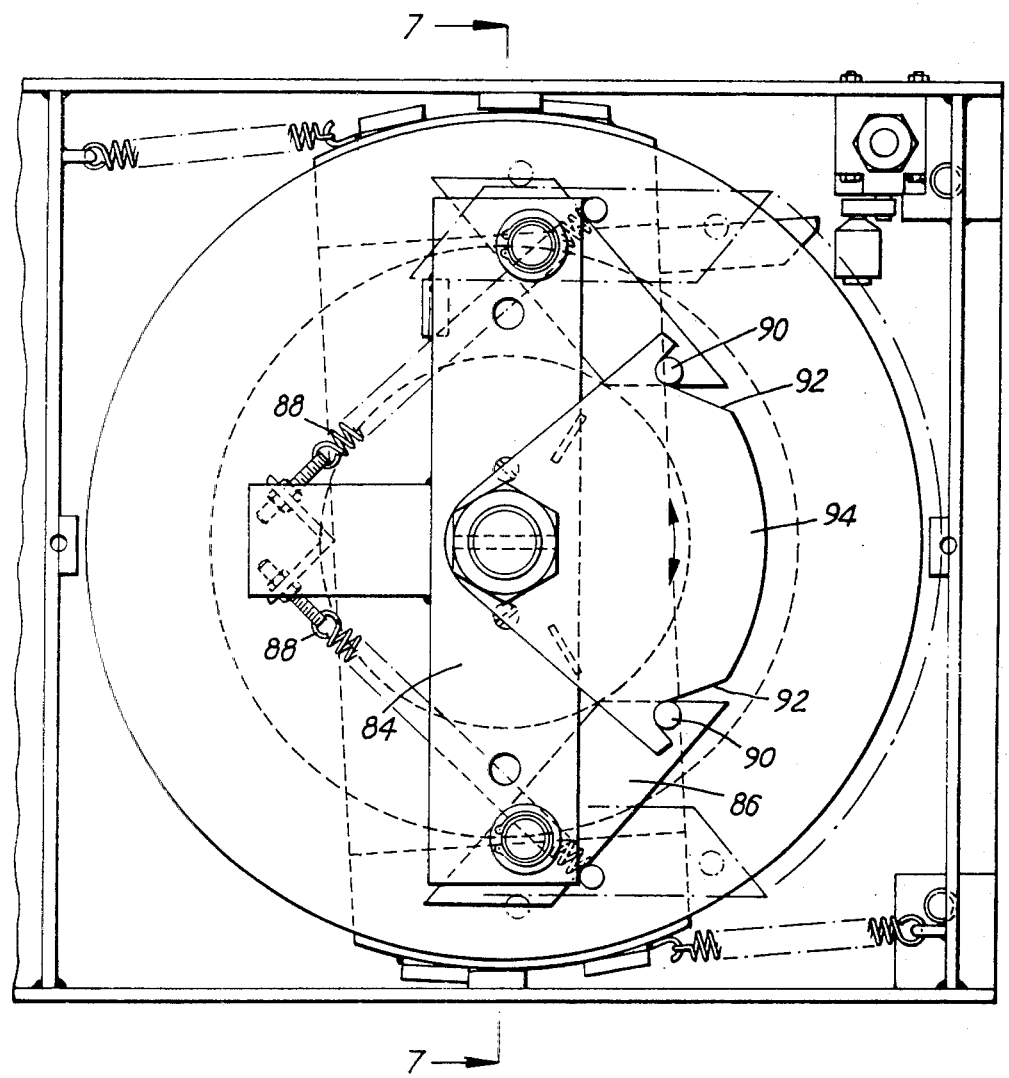
FIG. 6 shows an elevation of a third braking device in accordance with the invention which is adapted to be operable during motion in either direction.
Figure 7:
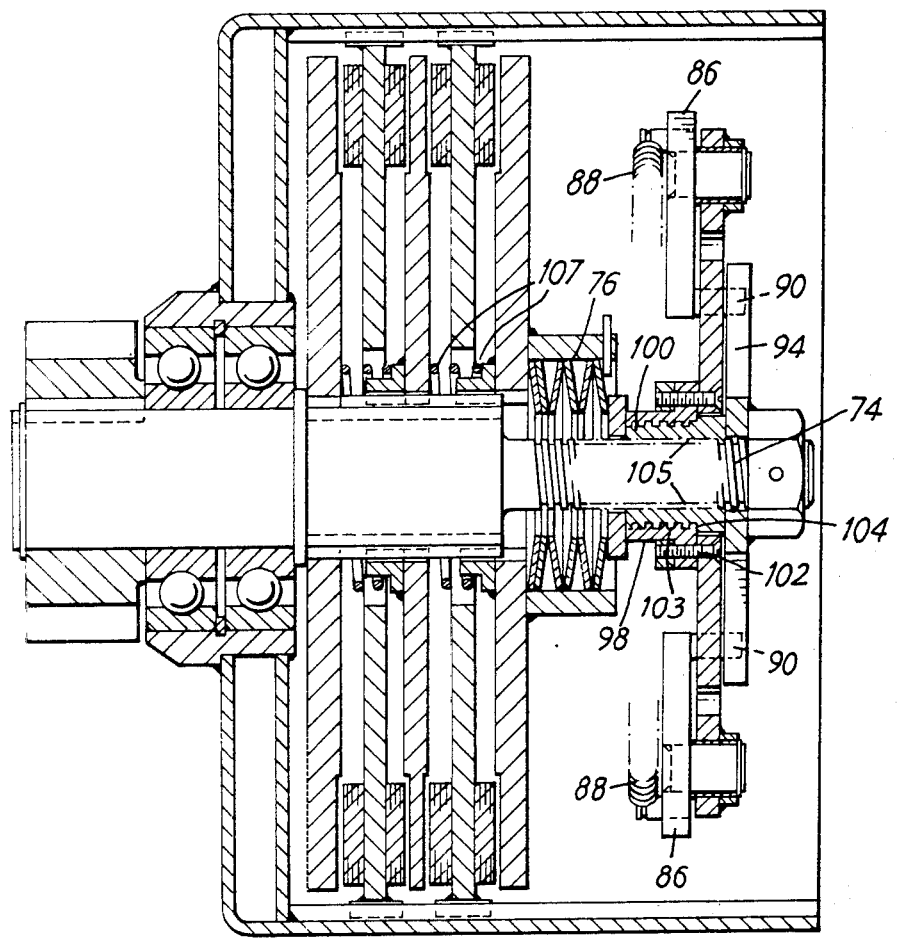
FIG. 7 is a section view of the braking device of FIG. 6 along the line 7—7 of FIG. 6.

Many large hoist systems incorporate a counterweight and it is desirable in such cases, that the safety braking device will operate when the hoist is travelling in both directions. The device shown in FIGS. 6 and 7 is adapted to do this. The restraining arm 94 is generally sector-shaped and has two slots 92. These slots accommodate pegs 90 on a pair of pivoted weights 86 mounted on the bar 82 equidistant from the axis of the shaft and diametrically opposite one another. The weights project from the bar in opposite senses of rotation. The slots 92 are shaped in such a way that if one peg 90 moves out of engagement with its slots 92, the other is pushed out so that the bar and the arm become free for rotation relative to one another.

The nut member 64 comprises two concentric sleeves 98 and 100. The inner surface of the outer sleeve and the outer surface of the inner sleeve have interengaging screw threads 103. The inner surface of the inner sleeve and the outer surface of the shaft have interengaging screw threads 105 of the opposite hand to the thread 103. The outer sleeve 98 is fixed by means or bolts 102 so that it cannot rotate relative to the bar 84. The inner sleeve 100 can rotate relative to the bar 84.

When the shaft 22 is rotating in one sense and the activating means is activated to stop rotation of the nut 64, any rotation of the inner sleeve 100 relative to the outer sleeve 98 will cause the outer sleeve to move axially relative to the inner sleeve, away from the disc brake until it abuts a stop 104 on the inner sleeve which prevents further axial move of the outer sleeve relative to the inner sleeve. Thereafter all relative rotation between the shaft 22 and nut 64 must take place between the inner sleeve 100 and the shaft. Because the screw threads 104 are of the opposite hand to the screw thread 103, this relative rotation of the inner sleeve and shaft causes the inner and outer sleeves together to move axially relative to the shaft towards the disc brake, thus compressing the spring 76.

When the shaft 22 is rotating in the opposite sense and the activating means stop the nut 64 rotating, any rotation of the inner sleeve 100 relative to the shaft 22 causes the inner sleeve to move axially away from the disc brake relative to the shaft until the inner sleeve abuts a stop provided by the restraining arm 94 which prevents further relative rotation between the inner sleeve and shaft. Thereafter all further relative rotation between the nut 64 and the shaft takes place between the inner and outer sleeves. Because the threads 105 and 103 are of opposite hands the relative rotation of the inner and outer sleeves cause the outer sleeve to move axially towards the disc brake.

Thus irrespective of the sense of rotation of the shaft, when the speed limit is exceeded and the activating means is activated the outer sleeve is caused to move towards the disc brake and the spring 76 is compressed causing the brake to be applied.

In the embodiment of FIGS. 6 and 7 the braking force that can be achieved by the brake is increased without increasing the diameter of the brake by providing the brake with a plurality of discs 66 each keyed to the shaft 22 but free to move axially, and a plurality of fixed plates 68. The fixed plates and discs are placed alternately and biassed apart by springs 107. Compression of the spring 76 causes the stack of fixed plates and discs to be pressed together into frictional contact.

Figure 8:
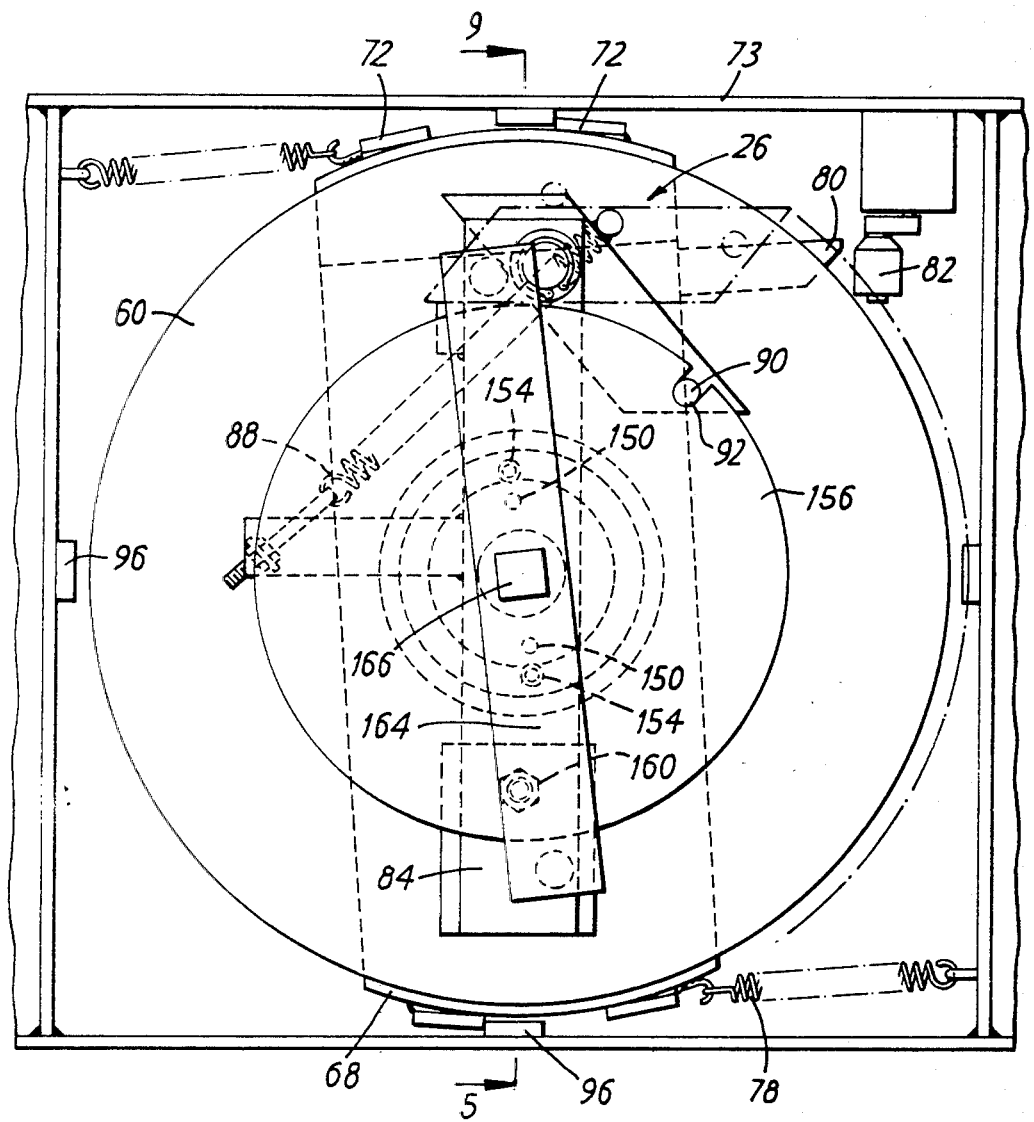
FIG. 8 shows an elevation of a fourth braking device in accordance with the invention.
Figure 9:
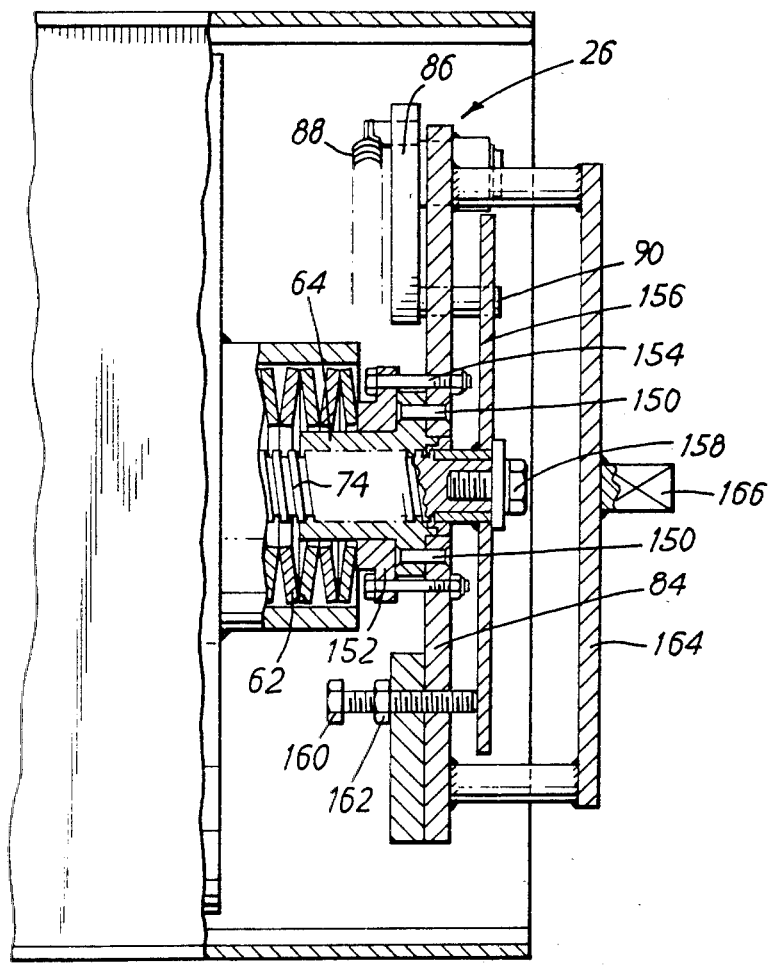
FIG. 9 is a sectional view of the braking device of FIG. 8 along the line 9—9 of FIG. 8.

The embodiment of FIGS. 8 and 9 is similar to the embodiment of FIGS. 4 and 5 and the same reference numerals have been used for corresponding parts. The embodiments differ in the following respects.

With the embodiment of FIGS. 4 and 5 there is in certain circumstances, for example when the hoist is overloaded, a risk that torque exerted on the brake may strip the threads from the screw-threaded parts 64 and 74 causing the compression on the Belleville washers 62 to be completely released and total brake failure. To avoid this danger, in the embodiment of FIGS. 8 and 9 the bar 84 which carries the pivoted weight 86 is coupled to the nut member 64 to transmit torque by shear pins 150. A collar 152 and bolts 154 hold the nut member 64 and the bar 86 together in the axial direction without preventing relative rotational movement when subject to large torques. With this arrangement when there is an overload the pins 150 will shear before the overload can strip the threads from the members 64 and 74. Although the shearing of the pins 150 will prevent further turning of the nut member relative to the threaded portion 74 of the shaft 22, it will not release the compression of the Bellville washers 62 from the state reached at the time of failure. Thus although the brake will not become fully activated in the event of an overload, some braking effect will be maintained.

To reset the brake of FIGS. 4 and 5 after it has been activated the weight 86 is pivoted inwardly to clear the stops 96. The nut member 64 and bar 84 and then turned relative to the shaft 22 to release the pressure on the Bellville washers 62. On each turn the weight has to be pulled out to allow the peg 90 to be moved past the arm 94, until the correct position for the nut member is reached and the peg is located in the slot 92. This makes resetting a difficult operation. Furthermore, it is important that the brake is always reset to the same condition. The brake should be applied as soon as possible after the mechanism has been tripped. There should therefore be as little free movement as possible before the Bellville washers are compressed. With the arrangement of FIGS. 4 and 5 it is easy to give an extra turn when resetting the brake. This may correspond to 15 to 18 inches of free travel of the hoist before the brake is applied in the event of an emergency.

In the embodiment of FIGS. 8 and 9 the arm 94 is replaced by a disc 156 which is fixed to the shaft 22 by a screw 158. The periphery of the disc has a single slot or notch 92 for receiving the peg to lock the weights and bar 84 in rotation to the shaft 22 when the brake is not activated. When resetting the brake the weight is pivoted inwardly and the peg 90 rides around the periphery of the disc 156 as the nut member is rotated. In practice as the nut member is turned the peg 90 will ride over the notch 92 in the disc so that rotation of the nut member into the reset position is facilitated.

To enable the brake to be reset in the correct position the bar 84 carries an adjusting screw 160 with a locking nut 162. The adjusting screw is set so that when the correct number of turns of the nut member 64 have been made so as just to release the pressure on the Bellville washers 62 the screw 160 comes into contact with the back of the disc 156 and further rotation is prevented.

For fine adjustment of the brake when setting up the brake in the first instance the screw 158 may be untightened to allow the position of the disc and hence the notch 92 relative to the shaft to be adjusted.

To assist in turning the nut member 64 when resetting the brake a bridge member 164 is secured to the bar 84 and carries centrally a square driving shank 166 to take a ratchet spanner.

What we claim is:

1. An overspeed safety braking device comprising an input shaft, the speed of which is to be braked when it succeeds a limit value, a rotary friction brake having a fixed part and a rotary part, the input shaft being permanently coupled for rotation with the rotating part of the rotary friction brake; a control device for applying the brake; and centrifugal activating means for activating said control device, said centrifugal actuating means comprising a support member which rotates with the input shaft when the speed is below the limit value, a weight pivotally mounted on said support member, an overcenter biasing means coupled between said weight and said support member, said biasing means being arranged to bias the weight toward the axis of rotation of the shaft until the speed has exceeded the limit value and to bias the weight away from the axis of rotation after the speed has exceeded the limit value, thereby irreversibly applying the brake so that even when the speed of the shaft is slowed down below the limit value, the overcenter biasing means remains in an overcenter position.

2. A braking device according to claim 1 in which the weight is pivotably mounted so that it swings away from the axis of rotation of the shaft as the speed increases and in which the biassing means comprises a spring whose line of action passes from one side of the pivot axis of the weight to the other at the limit value.

3. A braking device according to claim 1 in which the brake includes means for biassing the rotating part and a fixed part of the brake into engagement with one another, and in which the control device includes latching means which normally causes the fixed and rotating parts of the brake to be held apart but which is released when the control device is activated to allow the biassing means to move the fixed and rotating parts into engagement.

4. A braking device according to claim 3 in which the latching means normally restrains the biassing means to prevent the fixed and rotating parts being moved into engagement.

5. A braking device according to claim 4 in which the brake includes a lever, the biassing means acting on the lever at one end and an abutment near the other end bearing on the fixed part of the brake.

6. A braking device according to claim 5 in which the latching means comprises a spindle rotatable about an axis parallel to the axis of the input shaft, the spindle carrying a stop which can engage under the lever to hold the abutment in a retracted position so that the fixed and rotating parts are out of engagement, but which can be removed from below the lever by rotation of the spindle so that the biassing means urges the abutment into a forward position in which it holds the fixed and rotating parts in engagement.

7. A braking device according to claim 6 in which the spindle carrying on arm which, then the stop is positioned below the lever, extends toward the axis of rotation of the input shaft as far as the orbit which a catch carried by the weight describes when the shaft is rotating at the limit speed, so that when the speed of the shaft exceeds the limit the catch strikes the arm causing it to rotate and removing the stop from below the lever.

8. A braking device according to claim 7 in which there are two such levers and latching means, the abutments of the two levers acting on the fixed part of the brake at two diametrically opposite positions and the latching means being operated by a common activating means.

9. A rack and pinion hoist with a safety overspeed braking device according to claim 6 in which the spindle carries an arm arranged to operate a switch when the spindle is pivoted thereby cutting off the power supply to the hoist.

10. A braking device according to claim 1 in which the brake includes means for biassing the rotating part and a fixed part of the brake into engagement and the control device includes means for compressing the biassing means when activated.

11. A braking device according to claim 10 in which the means for compressing comprises a first member with a screw-thread which is engaged with a complementary screw-thread on a second member fixed to the input shaft, the first screw-threaded member being arranged to rotate with the second screw-threaded member and the input shaft when the speed is below the limit but being prevented from rotation by the activating means at speeds above the limit whereby the first threaded member travels axially on the second screw-threaded member to compress the biassing means.

12. A braking device according to claim 11 in which the said support member is fixed to the first screw-threaded member, an abutment surface provided on the weight, the catch engaging a fixed stop when the speed of the shaft exceeds the limit value to prevent rotation of the first screw-thread member.

13. A braking device according to claim 12 including a first locking member fixed to the weight and a second locking member fixed to the second screw-threaded member, the first locking member engaging the second locking member to prevent relative rotation of the first and second screw-threaded members, the first locking member disengaging the second locking member when the weight has moved a certain distance away from the axis of rotation.

14. A braking device according to claim 11 in which the first screw-threaded member comprises inner and outer parts with complementary interengaging screw threads of the opposite hand to the interengaging screw-threads of the first and second members, and a stop to limit the extent of relative axial movement between the inner and outer parts and between the first and second members so that the first member compresses the biassing means when the control device is activated in either sense of rotation.

15. A braking device as claimed in claim 14 in which the second screw-threaded member comprises a portion of a shaft on which the rotary parts of the brake are mounted and the first screw-threaded member comprises a nut having two concentric sleeves provided with opposite-handed screw-thread, the inner sleeve having an annular flange at its end furthest from the brake and being rotatable relative to the weight-carrying member of the activating means, and the outer sleeve being non-rotatably fixed to the weight-carrying member so that when the said member is held stationary, one or other of the sleeves will move in such a direction as to compress the biassing means; the operative sleeve being determined by the direction of rotation of the shaft.

16. A rack and pinion hoist with a safety overspeed braking device according to claim 11 in which the input shaft is fixed to a pinion which engages the rack of the hoist and in which the means for compressing comprises a first screw-threaded member coupled for rotation with the pinion and a second screw-threaded member coupled to the activating means which normally rotates with the first screw-threaded member; the activating means engaging a fixed stop when the limit value on the speed of rotation of the pinion is exceeded, so that the second screw-threaded member is prevented from rotating and moves axially relative to the first screw-threaded member, thereby applying pressure to the biasing means.

17. A braking device according to claim 10 in which the activating means is arranged to activate the control device when the speed limit is exceeded in both senses of rotation and in which the compressing means is arranged to compress the biassing means when activated in either sense of rotation.

18. A braking device according to claim 1 in which the activating means continue to activate the control device after the speed of the shaft has fallen below the limiting value.

19. A braking device as claimed in claim 1 in which the brake comprises a plurality of rotary brake plates and a plurality of fixed plates, the rotary and fixed plates being positioned alternately along the axis of the input shaft, the fixed plates being restrained against rotation, but at least some of the fixed plates being free to move axially relative to the shaft axis so that when the control device is activated the plates are urged against one another.

20. A rack and pinion hoist with a safety overspeed braking device according to claim 1 in which the input shaft is fixed to a pinion which engages the rack of the hoist.

21. A hoist according to claim 20 in which the activating means is arranged to cause a switch to be operated when the limit value on the speed of rotation is exceeded, thereby cutting off the power supply to the hoist.

22. A hoist according to claim 21 including first and second limiting stops adjacent to the fixed part of the brake, the fixed part of the brake being movable angularly about an axis of rotation of the shaft between opposite end end positions in which the said foxed part engages the first and second limiting stops, respectively, there being provided means for biasing the said fixed part into one of the opposite end positions and the said fixed part having means provided thereon for operating said switch whereby when the brake is applied, frictional engagement between the fixed part and the rotary part of the brake causes the fixed part to move between the said opposite end positions and operate said switch to cut off the power supply to the hoist.

23. A braking device according to claim 1 including first locking means provided on the weight and second locking means associated with the input shaft, the first and second locking means being interchangeable when the speed is below the limit value to cause the weight to rotate with the input shaft and the second locking means being disengaged from the first locking means when the weight moves away from the axis of rotation as the speed exceeds the limit value.

24. A braking device according to claim 23 in which the first locking means is a peg fixed to the weight and the second locking means is a notch formed in the periphery of a restraining member mounted for rotation with the inner shaft.

25. A braking device according to claim 24 in which the restraining member is a disk mounted coaxially with the input shaft.

26. A braking device according to claim 1 in which the distance of the pivot axis of the weight from the axis of rotation of the shaft is not less than the inner radius of the friction surfaces of the brake.

27. An overspeed safety braking device comprising an input shaft, the speed of which is to be braked when it exceeds a limit value, and which is permanently coupled for rotation with the rotating part of a rotary frictional brake, means responsive to the speed of rotation of the front shaft exceeding the limit value for activating a control device to apply the brake and thus brake the input shaft, means for biassing the rotating part and a fixed part of the brake into engagement and the control device includes means for compressing the biassing means when activated, the means for compressing comprising a first member with a screw-thread which is engaged with a complementary screw-thread on a second member fixed to the input shaft, the first screw-threaded member being arranged to rotate with the second screw-threaded member and the input shaft when the speed is below the limit but being prevented from rotation by the activating means at speeds above the limit whereby the first threaded member travels axially on the second screw-threaded member to compress the biassing means, the activating means comprising a member which is fixed to the first screw-threaded member and which carries a weight biassed towards the axis of rotation and which can move away from the axis of rotation against the action of the biassing means as the speed of rotation increases, a catch being carried by the weight, the catch engaging a fixed stop when the speed of the shaft exceeds the limit value to prevent rotation of the first screw-thread member, and a first locking member fixed to the weight and a second locking member fixed to the second screw-threaded member, the first locking member engaging the second locking member to prevent relative rotation of the first and second screw-threaded members, the first locking member disengaging the second locking member when the weight has moved a certain distance away from the axis of rotation.

* * * * *